United States Patent [19]

Lamérant et al.

[11] 4,171,205

[45] Oct. 16, 1979

[54] PROCESS FOR OBTAINING AN ALUMINUM SULFATE HYDRATE FROM AN IMPURE SULFURIC ACID SOLUTION OF ALUMINUM SULFATE

[75] Inventors: Jean M. Lamérant; Joseph Cohen, both of Aix-en-Provence; Pierre Maurel, Gardanne, all of France

[73] Assignee: Aluminium Pechiney, Lyons, France

[21] Appl. No.: 973,932

[22] Filed: Dec. 28, 1978

Related U.S. Application Data

[63] Continuation-in-part of Ser. No. 917,067, Jun. 19, 1978, abandoned, which is a continuation of Ser. No. 733,855, Oct. 19, 1976, abandoned.

[51] Int. Cl.² ............................................. B01D 9/02
[52] U.S. Cl. ..................................... 23/296; 23/301; 23/305 A; 423/128; 423/556
[58] Field of Search .................. 23/301, 296, 305 A; 423/128, 556

[56] References Cited

U.S. PATENT DOCUMENTS

| | | | |
|---|---|---|---|
| 2,476,979 | 7/1949 | Hoeman | 423/128 |
| 3,141,743 | 7/1964 | Marsh | 23/305 A |
| 3,143,392 | 8/1964 | Seaman | 23/305 A |
| 3,193,345 | 7/1965 | Marsh | 423/132 |
| 3,330,622 | 7/1967 | Seaman | 423/556 |
| 3,397,951 | 8/1968 | Jamey et al. | 423/556 |
| 3,484,196 | 12/1969 | Cohen et al. | 423/128 |
| 4,039,615 | 8/1977 | Mikami et al. | 423/128 |

FOREIGN PATENT DOCUMENTS 584728 1/1947 United Kingdom .................. 423/556

OTHER PUBLICATIONS

Hemy et al., "Journal of American Chem. Soc.", vol. 72, 1950, pp. 1282–1286.

*Primary Examiner*—Herbert T. Carter
*Attorney, Agent, or Firm*—Dennison, Dennison, Meserole & Pollack

[57] ABSTRACT

Process for recovering aluminum in the form of a specific acid sulfate from an initial solution containing aluminum in the form of dissolved aluminum sulfate hydrate in which the specific acid sulfate is of the formula $Al_2(SO_4)_3 \cdot 0.5 H_2SO_4 \cdot 11$ to $12 H_2O$ and in which the initial solution is sequentially treated in a series of crystallizers, wherein successive crystallizers are maintained at a predetermined decreased generally fixed temperature such that in each crystallizer a state of supersaturation of aluminum acid sulfate exists and the parameters attendant operation of each crystallizer insure that a state of static equilibrium of precipitation of product is generally reached before the process solution/slurry is passed to a successive crystallizer, or filtered for recovery of product.

7 Claims, 4 Drawing Figures

⊢——⊣ 0,1 mm

PROCESS FOR OBTAINING AN ALUMINUM SULFATE HYDRATE FROM AN IMPURE SULFURIC ACID SOLUTION OF ALUMINUM SULFATE

This application is a continuation-in-part of application Ser. No. 917,067, filed June 19, 1978, now abandoned, which is a continuation of application Ser. No. 733,855, filed Oct. 19, 1976, now abandoned.

BACKGROUND OF THE INVENTION

The present invention concerns the recovery of aluminum in the form of a specific acid aluminum sulfate hydrate from an impure sulfuric acid solution of aluminum sulfate.

Numerous processes have been described in which an aluminous material, for example a silico-aluminous material, is attacked by a sulfuric acid solution. The hot solution from such a treatment mainly contains aluminum sulfate, but also free sulfuric acid in excess and other metal sulfates such as iron and titanium sulfates and possibly potassium, sodium and/or magnesium sulfates, the nature and amount of which obviously depend on the composition of the treated material and the conditions of the attack.

Various processes have been proposed for the recovery of elemental aluminum from such solutions, in which the aluminum is precipitated as a sulfate, or chloride, which may then be decomposed in order to produce alumina, or sold.

The literature also mentions many specific sulfates that are produced from such solutions, namely anhydrous neutral sulfate, hydrated neutral sulfates containing 4, 6, 9, 12, 14, 16 or 18 $H_2O$, basic sulfates and various acid sulfates, for example with 1 or 0.5 $H_2SO_4$ and 12 $H_2O$. (See, for example, *Journal of Metals*, July, 1966, pages 811–818, or Linke, 4th Edition, Volume 1, Van Nostrand Company, Inc., 1958, pages 206 ff.).

Some authors doubt the existence of certain of these sulfates for in general they crystallize slowly and their filterability is poor; the cake resulting from their separation, even by filtration, is impregnated with a large amount of impure sulfuric acid-aluminum sulfate mother liquor which makes analysis inaccurate, even after washing. When one goes from a pure solution to an industrial solution which, as has just been said, contains dissolved sulfates other than of aluminum, the presence of a large amount of mother liquor has, in addition to the separation difficulties resulting therefrom, the disadvantage that undesirable amounts of metal sulfates, other than aluminum sulfates, are left in the separated solid mass, some of which involve complex or expensive operations if they are to be subsequently completely separated from aluminum sulfate. In fact, a total separation is very difficult, for in the majority of cases, it requires many successive operations in order to obtain an alumina which is sufficiently pure for metallurigical purposes.

In U.S. Pat. No. 3,484,196 at an intermediate step in the recovery process disclosed obtains an acid aluminum sulfate having essentially the composition $Al_2(SO_4)_3.0.5H_2SO_4.11–12H_2O$, which sulfate is then subjected to treatment by the process described in U.S. Pat. No. 3,397,951 followed by sulfuric acid washing for the recovery of aluminum in the form of the desired neutral sulfate, namely $Al_2(SO_4)_3.5.5H_2O$. However, little if any guidance is provided with respect to the parameters for obtaining as the product the acid aluminum sulfate with a morphology that provides a filter cake than can readily be washed for recovery of an essentially pure acid aluminum sulfate.

U.S. Pat. No. 4,039,615 discloses the preparation of hexagonal plate crystals of aluminum sulfate by a specific recrystallization process whereby a slurry containing precipitated aluminum sulfate crystals is heated to dissolve a portion of the crystals, prior to recrystallization of the sulfate to increase the size of hexagonal plate crystals recovered. However, from an industrial standpoint, particularly when one considers the large volumes of impure sulfuric acid aluminum sulfate solutions to be treated, it will be appreciated that the process disclosed is inherently disadvantageous due to the energy input required to repeatedly heat the slurry between recrystallization steps to improve purity of the sulfate, rather than teaching the use of steps that generally prevent a simultaneous precipitation of aluminum sulfate other than the specific acid aluminum sulfate hydrate desired.

The obtaining of a neutral aluminum sulfate of the formula $Al_2(SO_4)_3.5.5-6H_2O$ is disclosed in U.S. Pat. Nos. 3,143,392 and 3,141,743 while directed to studies of various products in an $Al_2(SO_4)_3.H_2SO_4$ system, wherein the former patent is directed to a crystallization process with classification and recycling of the "fines" and the latter patent in a broad statement states that the process is generally applicable to all known aluminum sulfates.

However, as is recognized in the art by the considerable patents directed thereto, recovery of a specific substantially pure aluminum sulfate hydrate requires adherence to parameters that are not obvious, without undue experimentation, in view of broad statements as to a process being applicable to all known aluminum sulfates.

The present invention concerns means for obtaining by precipitation a specifically defined acid aluminum sulfate hydrate which can be easily washed by virtue of the crystaline morphology of the filter cake so as to provide a source of relatively pure aluminum from what would otherwise be waste products. It has been found that the acid aluminum sulfate hydrate of the formula:

$$Al_2(SO_4)_3.0.5H_2SO_4.11 \text{ to } 12H_2O$$

achieves the desired result. Its precipitation requires the predetermined selection of a starting mother liquor and manipulative steps which, in particular, generally prevent a simultaneous precipitation of aluminum sulfates other than the specific acid aluminum sulfate hydrate set forth.

The difficulties experienced in avoiding such an undesired simultaneous precipitation of other aluminum sulfates are great since parameters attendant precipitation of the desired sulfate and undesired sulfates are close, and there exist metastable equilibria states and numerous supersaturated states, for the desired and undesired sulfates and the rates of precipitation of each of the numerous other various possible sulfates, especially when starting from supersaturated impure sulfuric acid aluminum sulfate solutions, are different, which contributes to the simultaneous undesirable precipitation of several sulfates, the mixture of which is difficult to filter and wash.

THE DRAWINGS

Figure 2:
FIG. 2 is a photomicrograph of a crystalline mass derived by utilizing the process comprising the present invention.
Figure 3:
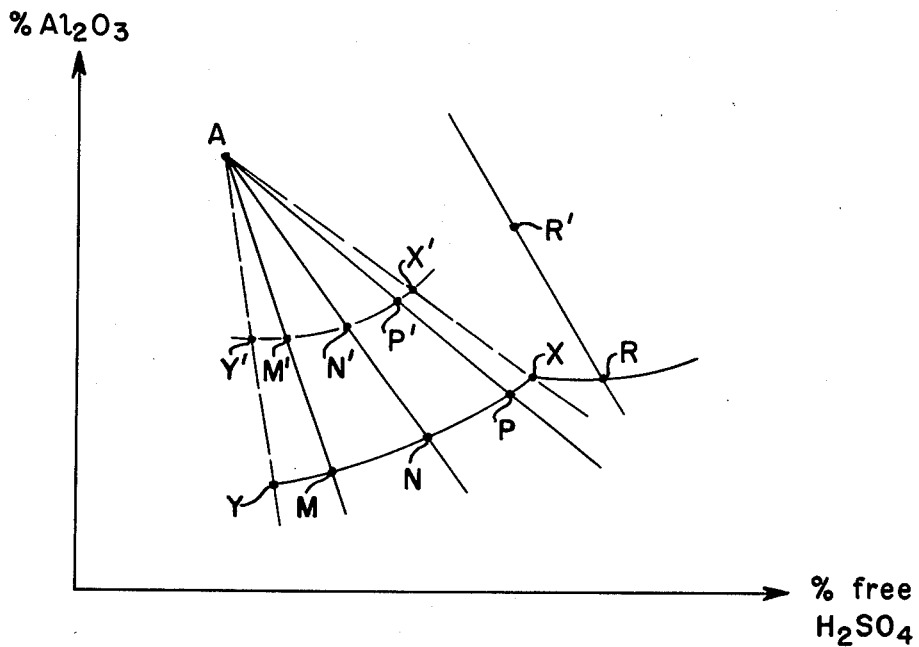
Figure 4:
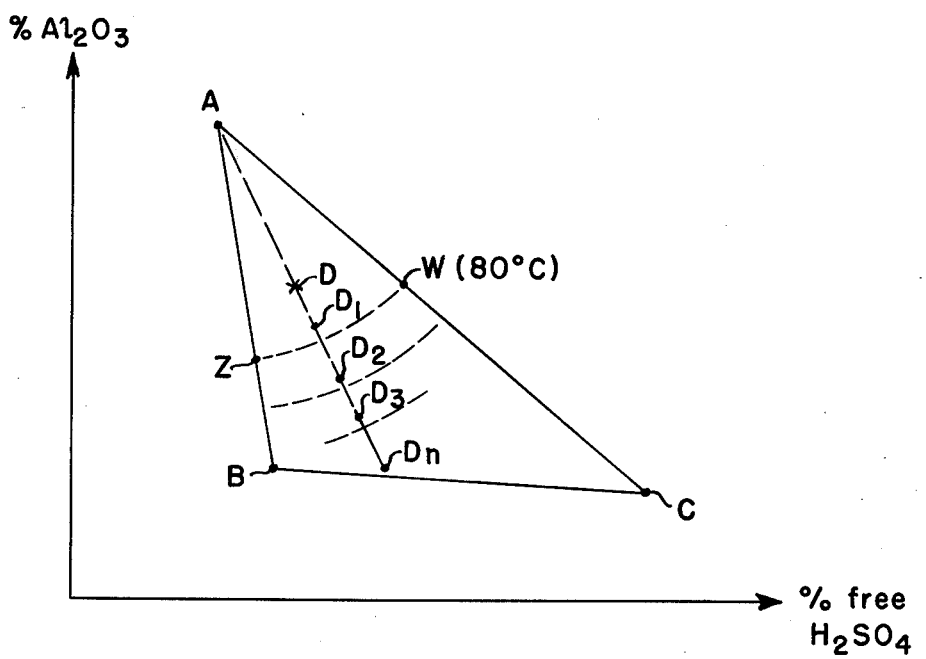

FIG. 3 is a graphic representation of the parameters of the composition of impure sulfuric acid aluminum sulfate liquor, wherein the aluminum present is expressed as alumina, utilized in the practice of the present invention; and, FIG. 4 is a graphic representation of a selected impure sulfuric acid aluminum sulfate mother liquor processed in accordance with the present invention to recover the aluminum content in the form of the specified acid aluminum sulfate as shown in FIG. 2.

THE INVENTION

The process according to the invention consists of introducing an impure sulfuric acid solution of aluminum sulfate resulting from the attack of an aluminous material by a sulfuric acid solution, into the first of a series of at least two crystallizers at a temperature such that when at the initial temperature of the first crystallizer, the impure sulfuric acid solution of aluminum sulfate is in a state of supersaturation with respect to the sulfate present, and that the point representing its composition on a diagram whose X-axis corresponds to the percentage of free $H_2SO_4$ and whose Y-axis corresponds to the percentage of sulfates of aluminum expressed as $Al_2O_3$, is located within a triangle whose vertex A is the point representing the precipitated acid aluminum sulfate hydrate product and has an abscissae of about 17% by weight and an ordinate of about 8% by weight and whose other vertices B and C, in a specific exemplary industrial embodiment, have abscissae of 39 and 56% respectively and ordinates of 1 and 0.5% respectively. The first crystallizer in the practice of the exemplary embodiment is maintained at a temperature no higher than about 80° C. to effect crystallization of the specified acid aluminum sulfate hydrate. The suspension is passed, e.g., cascaded, from one crystallizer to a succeeding one, each crystallizer being maintained at a temperature less than that of the preceding one, the temperature of the last crystallizer being as low as about 15° C. The residence time of the suspension in each crystallizer being sufficient to obtain therein a concentration of $Al_2O_3$ in the form of dissolved aluminum sulfate which approaches the static equilibrium of the $Al_2SO_3$ concentration at the temperature of the crystallizer in question, which concentration of $Al_2SO_3$ is of course lower, but still reduced from a supersaturated state to a generally static equilibrium state in each successive crystallizer, and finally separating the product defined acid aluminum sulfate crystals from the remaining impure mother solution.

The acid aluminum sulfate of the formula $Al_2(SO_4)_3.0.5H_2SO_4.11$ to $12H_2O$ produced by the present process is a specific sulfate. In fact, all X-ray diagrams have given the same lines. The principal lines observed (DEBYE-SCHERRER spectrum), classified by decreasing order of intensity, are:
4.89–3.19–3.48–4.03–3.65–3.97–1.96 and 2.32 Å.

Speaking specifically to the recitation "11 to 12 $H_2O$" in the formula of the acid aluminum sulfate product, it has not been possible to determine precisely the number of water molecules in the acid salt formula: $Al_2(SO_4)_3.0.5H_2SO_4.11$ to $12H_2O$ since in all instances it has been found that this number was between 11 and 12 $H_2O$. In fact, this sulfate hydrate is produced by precipitation from a liquor having predetermined contents of aluminum sulfate and $H_2SO_4$, the parameters of which are set forth in detail hereinafter, which is brought to a temperature within the crystallizer maintainance temperature range set forth above for establishment of a condition approaching the static equilibrium for the desired acid aluminum sulfate hydrate at that crystallizer maintenance temperature. After equilibrium is obtained at this temperature, there is a suspension of a precipitate of the desired acid aluminum sulfate hydrate as one phase and an "impure" mother liquor as a second phase.

The suspension is filtered and then dried, and yields a precipitate impregnated with some of the motor liquor, which is called a "base body." The base body and the mother liquor are analyzed separately.

Referring now specifically to FIG. 3 and FIG. 4, the following will be noted with respect to parameters for selection of an impure sulfuric acid aluminum sulfate composition to be utilized in practicing the present invention when the following values of AX'XYY' are taken into consideration:

(a) At a temperature within the range 80° C. to 15° C., generally toward the upper end of the temperature range (FIG. 3)

Point M is representative of the composition of the mother liquor. The point M' is representative of the composition of the "base body." Thus, the representative point of the composition of the precipitate $Al_2(SO_4)_3.0.5H_2SO_4.11$ to $12H_2O$ is obligatorily on the line passing through MM', but inevitably beyond the point M'.

(b) At the same temperature as (a) above, but starting from a liquor of different composition, the points N (liquor) and N' (base body) are obtained. The representative point of the composition of the precipitate is on the line passing through N and N', but not beyond N'.

The intersection point A of the two lines passing through MM' and NN' thus gives the true composition of $Al_2(SO_4)_3.0.5H_2SO_4.11$ to $12H_2O$ which is precipitated.

(c) At the same temperature as the preceeding, but using still another liquor composition, two points P and P' are obtained.

The line passing through PP' intersects lines MM' and NN' and their intersection point A. In fact, a certain displacement of this intersection exists, which is the reason for the imprecision regarding the number of water molecules combined in the sulfate. That is why the formula includes the extremes: 11 to 12 $H_2O$.

Range of existence and composition of the chosen liquor:

If the mother liquor is not properly selected, as diagrammatically shown in FIG. 3, points R and R' are obtained, and the line passing through these two points no longer intersect the aforementioned bundle of lines at point A, or in the A "zone."

It has been found that liquor compositions suitable for the practice of the present invention exist which correspond to the points XX' and YY', beyond which no more acid sulfate hydrate $Al_2(SO_4)_3.0.5H_2SO_4.11$ to $12H_2O$ is precipitated.

The points set forth in FIGS. 3 and 4 have the approximate values, by weight, as set forth in the following table.

TABLE I

| FIG. 3 (To 45° C.) | %Al$_2$(SO$_4$)$_3$ (expressed as Al$_2$O$_3$) | % Free H$_2$SO$_4$ |
|---|---|---|
| A | 16.80–17.32 | 8.07–8.32 |
| Y' | 13.80 | 14.80 |
| Y | 1.80 | 41.80 |
| M' | 13.80 | 15.20 |
| M | 1.60 | 43.70 |
| N' | 13.70 | 15.60 |
| N | 1.40 | 45.70 |
| P' | 13.70 | 16.20 |
| P | 1.10 | 48.50 |
| X' | 13.60 | 16.40 |
| X | 1.00 | 49.80 |
| R' | 12.58 | 23.75 |
| R | 0.70 | 59.00 |

| FIG. 4 | %Al$_2$(SO$_4$)$_3$ (expressed as Al$_2$O$_3$) | % Free H$_2$SO$_4$ |
|---|---|---|
| A | 16.80 to 17.32 | 8.07 to 8.32 |
| B | 39.00 | 1.00 |
| C | 56.00 | 0.50 |

The range of the existence of the desired acid sulfate of the above formula is thus derived by the process of the present invention when the liquor being subjected to successive crystallization is generally defined by points A, Y and X.

Point A is situated in the zone which can be calculated according to two limited formulas:

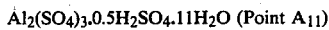

Al$_2$(SO$_4$)$_3$.0.5H$_2$SO$_4$.11H$_2$O (Point A$_{11}$)

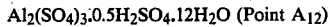

Al$_2$(SO$_4$)$_3$.0.5H$_2$SO$_4$.12H$_2$O (Point A$_{12}$)

wherein with 11H$_2$O, corresponding point A$_{11}$ has for coordinates 8.32% free H$_2$SO$_4$, and 17.32% Al$_2$O$_3$ and wherein with 12H$_2$O, point A$_{12}$ has for coordinates 8.07% free H$_2$SO$_4$ and 16.80% Al$_2$O$_3$.

Thus, all "properly selected liquor" of which the representative point of the composition is found in the zone generally defined by AYMNPX or more particularly, AY'YMNPXX', will generate the sulfate hydrate Al$_2$(SO$_4$)$_3$.0.5H$_2$SO$_4$.11 to 12H$_2$O, after static equilibrium is generally obtained, i.e., reached, at the temperature and residence time in a given crystallizer.

The diagram comprising the triangle ABC first described above broadly, and hereinafter more specifically, corresponds to the inclusion of the different AXY ranges, for the temperatures between 80° C. at the most and 15° C. at the least as discussed.

Broadly, in an exemplary industrial embodiment, see FIG. 4, the triangle ABC, corresponding to that of the parameters of the disclosure is defined, and the composition of a properly selected liquor is represented by D. By lowering the temperature to 80° C. constant-temperature curve ZW (isotherm ZW, as a broken line curve), a liquor composition represented by D$_1$ is obtained, which is not completely on isotherm ZW because of its supersaturated state. By successively lowering the temperature of the liquor to lower isotherms, as diagrammatically illustrated, while passing from crystallizer to crystallizer, liquors are obtained in which the compositions evolved are represented by tye series of points D$_2$, D$_3$ ... D$_n$.

Concerning temperature parameters in the first crystallizer, the composition of the original liquor is such that when maintained, a preselected temperature within the above-stated range in a first crystallizer, the liquor comprising the impure sulfuric acid solution of aluminum sulfate is then in a state of supersaturation.

In fact, the temperature of the liquor introduced, e.g., point D of FIG. 4, i.e., greater than 80° C., into the first crystallizer is necessarily higher than that of this crystallizer. Because of this, it can be said that, relative to point D$_1$ of dynamic equilibrium, it is at a state of supersaturation.

The composition of the mother liquor coming from the last crystallizer (D$_n$ of FIG. 4), which is a function of the composition of the original liquor D, is on a line passing through points AD and is near static equilibrium D$_n$, corresponding to the temperature of the last crystallizer.

It should be noted that the coordinates of the vertices B and C of the triangle ABC which has just been defined may be slightly modified by the presence in the solution of sulfates other than aluminum sulfate.

The composition of the solution to be treated may be brought within the previously defined area AYMNPX, i.e., AY'YMNPXX', by any suitable means known per se, such as evaporation or addition of water, or addition of sulfuric acid.

It is advantageous to wash the crystals separated from the residual solution.

It has been mentioned that to enhance the purity of the desired acid aluminum sulfate hydrate, an attempt is made to provide in each crystallizer, of the series, a concentration of dissolved aluminum sulfate as close as is practicable to the static equilibrium at the temperature of this crystallizer. The term static equilibrium will be understood to be the concentration of aluminum sulfate which would be reached at the end of a long residence time, e.g., 3 hours, but more significantly, below which concentration appreciable crystallization of the product acid aluminum sulfate hydrate does not generally occur. Due to the circulation of the suspension within a given crystallizer, such as by mechanical aggitation, for example, a composition of the mother liquor is established which, in accordance with a significant aspect of the invention, is maintained close to the static equilibrium, as discussed in greater detail below, in order to prevent the precipitation of aluminum sulfates other than the desired acid aluminum sulfate product. It will be appreciated that in order to obtain the desired proximity to the static equilibrium, the residence time in each crystallizer and its temperature may both be varied.

In general, several successive crystallizers are used wherein the temperatures are incrementally decreased from one crystallizer to a successive crystallizer wherein an initial crystallizer is preferably at a temperature of about 80° C. and wherein a final crystallizer in the series is at a temperature no lower than about 15° C. For the same starting liquor, the total amount of crystallized desired acid aluminum sulfate hydrate product is greater the lower the temperature of the last crystallizer. However, it may be preferred not to reduce the temperature in the last of a series of crystallizers below about 30° to 40° C. in order to avoid the disadvantages due to the increase in the viscosity of the liquid phase of the suspension, which undesirably increases the proportion of mother liquor in the cake separated during the filtration of the final suspension by physically trapping the liquor in the cake.

The number and volumetric capacity of the crystallizers are generally chosen for a given flow rate as a function of the rate of crystallization of the sulfate $Al_2(SO_4)_3.0.5H_2SO_4.11$ to $12H_2O$ at each temperature and of the desired proximity, at each temperature, between the $Al_2O_3$, in the form of aluminum sulfate, concentration of the liquid phase of the suspension present in a crystallizer and the corresponding concentration of $Al_2O_3$, in the form of aluminum sulfate, at static equilibrium at the temperature of this crystallizer. For this purpose, crystallizers of different volumes may be used, with identical incremental temperature differences, i.e., decreases, between the successive crystallizers, the residence time thus varying from one to the other for a given throughput. For technical reasons, it is generally preferred to use successive crystallizers of the same volume, and under these conditions a better productivity is obtained, for a given overall residence time, by selecting similar temperature differences between one crystallizer and the following crystallizer. The $Al_2O_3$ content, in the form of aluminum sulfate, for each of the liquid phases is, as has already been said, established within area AYMNPXA and maintained close to that which corresponds to the static equilibrium under the conditions pertaining to this liquid phase of the suspension in a given crystallizer. For example, in a crystallizer operated at a temperature between about 40° C. and 60° C., it is preferable if the $Al_2O_3$ content of a liquid phase does not exceed by more than 0.7% the content which corresponds to the static equilibrium; at 70° C. it is preferred that this difference does not exceed 1.3%.

It may be advantageous to recycle crystals, to act as seed nuclei, in the first crystallizer of the series of crystallizers, since the "mother liquor" therein is essentially a solution. Such recycling of crystals is generally of no practical value for the following successive crystallizers which receive a suspension from a preceeding crystallizer wherein crystals are already present.

Figure 1:
FIG. 1 is a photomicrograph of a crystalline mass derived by not adhering to the process of the present invention.

The advantage resulting from the present process according to the manipulative steps and conditions which have been discussed are visually apparent from a consideration of FIGS. 1 and 2, which show, on the given scale adjacent FIG. 2, the poorly ordered crystalline masses obtained in the case of FIG. 1, i.e., the result of crystallizing by cooling without adhering to the present process, even though utilizing an impure sulfuric acid solution of aluminum sulfate whose composition is within the parameters of that used in the present process, and in the case of FIG. 2 by treating, in accordance with the process comprising the present invention, an impure sulfuric acid solution of aluminum sulfate having a composition approximating that of the solution utilized with respect to FIG. 1.

It is clear that in the case of FIG. 1, not utilizing the present process, a mixture of different crystalline species is obtained, which provides a cake that is very interlaced and difficult to filter, whereas in the case of FIG. 2, utilizing the process comprising the present invention, crystals of the same species, namely $Al_2(SO_4)_3.0.5H_2SO_4.11$ to $12H_2O$, are obtained, as confirmed by X-ray analysis as set forth above, which are of uniform morphology and consequently provide a cake that is easy to filter which results in obtaining a sulfate of improved purity for enhancing the subsequent recovery of relatively pure aluminum.

As an example, a solution of the following composition was available:

Sulfates of:

| Al | (expressed as $Al_2O_3$) | 6.88% |
|---|---|---|
| Fe | (expressed as $Fe_2O_3$) | 0.195% |
| Na | (expressed as $Na_2O$) | 1.5% |
| Ti | (expressed as $TiO_2$) | 0.113% |
| K | (expressed as $K_2O$) | 29.7% |
| at a temperature of 120° C. | | |

The temperature of this solution was reduced to 78° C. by evaporation in vacuo, thereby removing 55 g of water per 1000 g of starting solution. After this concentration the contents of free $H_2SO_4$ and $Al_2O_3$ were represented in a free $H_2SO_4/Al_2O_3$ diagram, see FIG. 3, by a point having an abscissa of 31.5% and ordinate of 7.2%.

A series of four double-walled crystallizers each having a volume of 3500 liters was used, each crystallizer being provided with a mechanical stirring device and arranged in cascade with respect to one another, the overflow from one flowing into the next crystallizer.

The solution at 78° C. was added continuously at a rate of 1056 liters/hour to the first crystallizer, which was maintained at a temperature of 70° C. A suspension of $Al_2(SO_4)_3.11$ to $12H_2O$ was formed.

After an average residence time of three hours, the suspension flowed into the second crystallizer, maintained at a temperature of 60° C. Crystallization was continued with an average residence time of three hours. The suspension then overflowed into the third crystallizer, whose temperature was maintained at 50° C. The residence time in this crystallizer was three hours. The suspension then overflowed into a fourth crystallizer whose temperature was maintained at 40° C. On leaving this last crystallizer, the suspension was directed to a rotary filter. 760 kg/hour of a cake comprising 145 kg/hour of mother liquors and 615 kg/hour of crystals having the composition $Al_2(SO_4)_3.0.5H_2SO_4.11.5$ to $12.5H_2O$ were obtained, which could easily be washed. These crystals, which are similar to those of FIG. 2, contained very small amounts of impurities in the form of sulfates of:

| Fe | (expressed as $Fe_2O_3$) | 0.0089% |
|---|---|---|
| Na | (expressed as $Na_2O$) | 0.2% |
| K | (expressed as $K_2O$) | 0.1% |
| Ti | (expressed as $TiO_2$) | 0.07% |

Those skilled in the art will appreciate that certain modifications may be made of the described embodiment of our invention without departing from the spirit thereof. Therefore, it is not intended to limit the breadth of our invention to the specific embodiment described, but rather the scope of our invention should be determined by the appended claims and their equivalents.

We claim:

1. A process for precipitating an acid aluminum sulfate of the formula $Al_2(SO_4)_3.0.5H_2SO_4.11$ to $12H_2O$ from an initial solution resulting from the treatment of an aluminous material with a sulfuric acid solution and containing aluminum sulfate hydrate as a result of the treatment, comprising the steps of sequentially treating the initial solution in a series of crystallizers in cascade relation by:
  (a) heating the initial solution in a first crystallizer vessel to establish a state of supersaturation of aluminum acid sulfate and wherein the composition of the solution within a triangle defined graphically by an abscissae denoting the percentage of free $H_2SO_4$ and an ordinate denoting a percentage of sulfates of aluminum expressed as $Al_2O_3$, wherein the triangle ABC whose vertex A represents precipitated aluminum sulfate has an abscissae of about 17% by weight and an ordinate of about 8% by weight and vertices B and C have abscissae of about 39% and about 56% respectively and ordinates of about 1% and about 0.5% by weight respectively;

(b) maintaining the first crystallizer at a temperature at most equal to about 80° C. for a solution residence time sufficient to provide a suspension that has generally reached a state of static equilibrium of precipitation of said acid aluminum sulfate;

(c) cascading the suspension to at least a second crystallizer maintained at a temperature lower than that of a preceding crystallizer and repeating step (b); and (d) recovering precipitated acid aluminum sulfate of the formula $Al_2(SO_4)_3.0.5H_2SO_4.11$ to $12H_2O$ as product.

2. The process of claim 1 wherein the temperature of the last crystallizer in a series is between about 30° C. and about 40° C.

3. The process of claim 1 wherein the temperature of the last crystallizer is as low as about 15° C.

4. The process of claim 1 wherein a series of successive crystallizers have about the same volumetric capacity wherein the reduction in temperature between any one crystallizer and a succeeding crystallizer is similar.

5. The process of claim 4 wherein a reduction of 10° C. is effected between successive crystallizers.

6. The process of claim 1 including adding acid aluminum sulfate seed crystal recycle from a succeeding crystallizer to a preceding crystallizer.

7. The process of claim 1 wherein residence time in each crystallizer is in the order of about three hours.

* * * * *